United States Patent [19]

Takano et al.

[11] 4,079,384

[45] Mar. 14, 1978

[54] INTEGRATED INK LIQUID SUPPLY SYSTEM IN AN INK JET SYSTEM PRINTER

[75] Inventors: Rikuo Takano, Musashino; Yuji Sumitomo; Yoichi Yamamoto, both of Nara; Tokio Maezawa, Yamatokoriyama, all of Japan

[73] Assignees: Nippon Telegraph and Telephone Public Corporation, Tokyo; Sharp Kabushiki Kaisha, Osaka, both of Japan

[21] Appl. No.: 730,955

[22] Filed: Oct. 8, 1976

[30] Foreign Application Priority Data

Oct. 9, 1975 Japan ............................... 50-122039
Dec. 8, 1975 Japan ............................... 50-146745

[51] Int. Cl.[2] ............................................ G01D 15/18
[52] U.S. Cl. ................................................ 346/140 R
[58] Field of Search .............................. 346/75, 140 R

[56] References Cited

U.S. PATENT DOCUMENTS

| | | | |
|---|---|---|---|
| 3,761,953 | 9/1973 | Halgeson et al. | 346/140 R X |
| 3,787,884 | 1/1974 | Demer | 346/140 R X |
| 3,831,727 | 8/1974 | Kruspe et al. | 346/75 X |
| 3,961,337 | 6/1976 | Jung et al. | 346/140 R |

*Primary Examiner*—George H. Miller, Jr.
*Attorney, Agent, or Firm*—Birch, Stewart, Kolasch & Birch

[57] ABSTRACT

In an ink liquid supply system for an ink jet system printer, an ink liquid reservoir, an air trap, a pump, an air chamber and an electromagnetic cross valve are made of resin blocks. Conduit means associated with the above-mentioned elements are formed in said resin blocks, whereby the elements are communicated with each other when the resin blocks are fixed to each other.

4 Claims, 14 Drawing Figures

INTEGRATED INK LIQUID SUPPLY SYSTEM IN AN INK JET SYSTEM PRINTER

BACKGROUND OF THE INVENTION

The present invention relates to an ink liquid supply system in an ink jet system printer.

In an ink jet system printer of the prior art, respective elements for forming an ink liquid supply system, such as a pump, an air chamber and an electromagnetic cross valve are discretely mounted on a metal base, and conduit means made of plastic pipes are provided in order to communicate the respective elements with each other.

The above-mentioned ink liquid supply system has the following demerits.

(1) The system becomes large because the conduit means, or, the plastic pipes, require a considerably large space for their installation.

(2) Numerous piping elements, such as joints and fastening rings are requires to communicate the respective elements.

(3) The system becomes large because the respective components are discrete from each other.

Moreover, the fabrication of the ink liquid supply system is troublesome and time consuming in the prior art system.

OBJECTS AND SUMMARY OF THE INVENTION

Accordingly, an object of the present invention is to minimize the size of an ink liquid supply system for use in an ink jet system printer.

Another object of the present invention is to reduce the required number of components to form an ink liquid supply system in an ink jet system printer.

Still another object of the present invention is to facilitate manufacture of an ink liquid supply system for use in an ink jet system printer.

Yet another object of the present invention is to facilitate maintenance and repair of an ink liquid supply system for use in an ink jet system printer.

A further object of the present invention is to provide an ink liquid supply system of high reliability.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink liquid reservoir, an air trap, a pump, an air chamber and an electromagnetic cross valve are made of resin blocks. Conduit means associated with the above-mentioned components are formed in the resin blocks, whereby the respective components are communicated with each other when the resin blocks are fixed to each other by screws or adhesive.

In another preferred form, a resin base having a conduit means formed therein is proposed. Respective components such as an ink liquid reservoir, a pump, an air chamber and an electromagnetic cross valve are mounted on the resin base and communicated with each other through the conduit means formed in the resin base.

BRIEF DESCRIPTION OF THE DRAWINGS

The present invention will become more fully understood from the detailed description given herebelow and the accompanying drawings which are given by way of illustration only, and thus are not limitative of the present invention and wherein.

DESCRIPTION OF THE PREFERRED EMBODIMENTS

Figure 1:
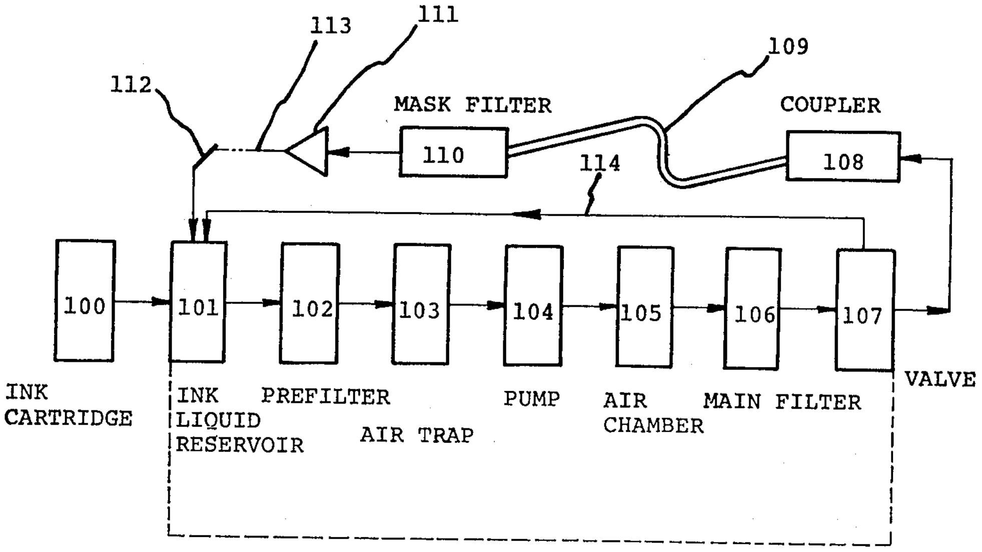
FIG. 1 is a block diagram of an ink liquid supply system in an ink jet system printer.

FIG. 1 is a block diagram showing a typical construction of an ink liquid supply system in an ink jet system printer.

An ink cartridge 100 is provided for supplying ink liquid to an ink liquid supply system. The ink cartridge 100 is detachable from the ink liquid supply system.

An ink liquid reservoir 101 has two inlets, one being connected to the ink cartridge 100 and the other being connected to a conduit for recovering ink liquid 113 emitted from a nozzle 111 but not contributive to the writing operation and collected by a beam gutter 112.

The ink liquid collected by the beam gutter 112 unavoidably includes dust such as thread drifting in the air which is captured when the ink liquid 113 travels from the nozzle 111 to the beam gutter 112. A prefilter means 102 is provided for removing fairly large impurities such as dust included within the ink liquid passing therethrough. The filtration accuracy of the prefilter means 102 is so selected that it only leaves particles of which the diameter is below 150 μm.

An air trap 103 is preferably provided for removing bubbles contained within the ink liquid which will be formed due to the variation of, for example, the temperature, thereby insuring the operation of a bellofram pump 104. The bellofram pump 104 is a constant pressure type and functions to supply the ink liquid to the nozzle 111 under a predetermined pressure.

An air chamber, or, an accumulator 105 is connected to the outlet site of the bellofram pump 104 in order to remove the pressure pulsation caused by the pump 104, thereby stabilizing the formation of the ink droplets. The air chamber 105 accumulates the ink pressure when the power supply to the system printer is terminated in order to reduce the preparation time required for preparing the system printer for conditions suited for stable printing after power is thrown on.

A line filter, or, a main filter 106 functions to remove impurities included within the ink liquid, thereby preventing the capillary tube portion of the nozzle 111 from becoming blocked with said impurities or preventing the occurrence of missing of dots due to the impurities. The filtration accuracy of the main filter 106 is so selected that it only leaves particles of which the diameter is below 3 μm. An electromagnetic cross valve 107 is provided for controlling the supply of the ink liquid to the nozzle 111. The electromagnetic cross valve 107 permits rapid switching of the ink supply.

The above-mentioned ink liquid reservoir 101, prefilter means 102, air trap 103, bellofram pump 104, air chamber 105, main filter 106 and electromagnetic cross valve 107 are, in accordance with the present invention, integrally fabricated through the use of resin blocks within which conduit means are formed for communicating the respective elements. The connection between the integrally formed elements 101 through 107 and the printer system is achieved through the use of a coupler 108.

A flexible conduit 109 is provided for connecting the coupler 108 with a mask filter 110 attached to the nozzle 111 mounted on a travelling carriage, thereby permitting the drive or travel of the nozzle 111. The mask filter 110 functions to prevent the capillary tube portion of the nozzle 111 from becoming blocked with the impurities which will be introduced into the ink liquid supply system at the time when the nozzle 111 and/or the flexible conduit 109 are exchanged.

When the electromagnetic cross valve 107 is in the condition where the coupler 108 is connected to the main filter 106, the ink liquid is supplied to the nozzle 111 through the coupler 108, the flexible conduit 109 and the mask filter 110. The ink liquid 113 issuing from the nozzle 111 is excited by an electromechanical transducer (not shown) attached to the nozzle 111 so that uniform ink droplets of a frequency equal to the exciting signal frequency are formed. The ink droplets not contributive to the writing operation are collected by the beam gutter 112 and recovered to the ink liquid reservoir 101.

When the power supply to the system printer is terminated, the coupler 108 is connected to the ink liquid reservoir 101 via the electromagnetic cross valve 107 and a returning conduit 114, whereby the ink liquid contained within the nozzle 111, the mask filter 110 and the flexible conduit 109 is returned to the ink liquid reservoir 101.

Figure 2:
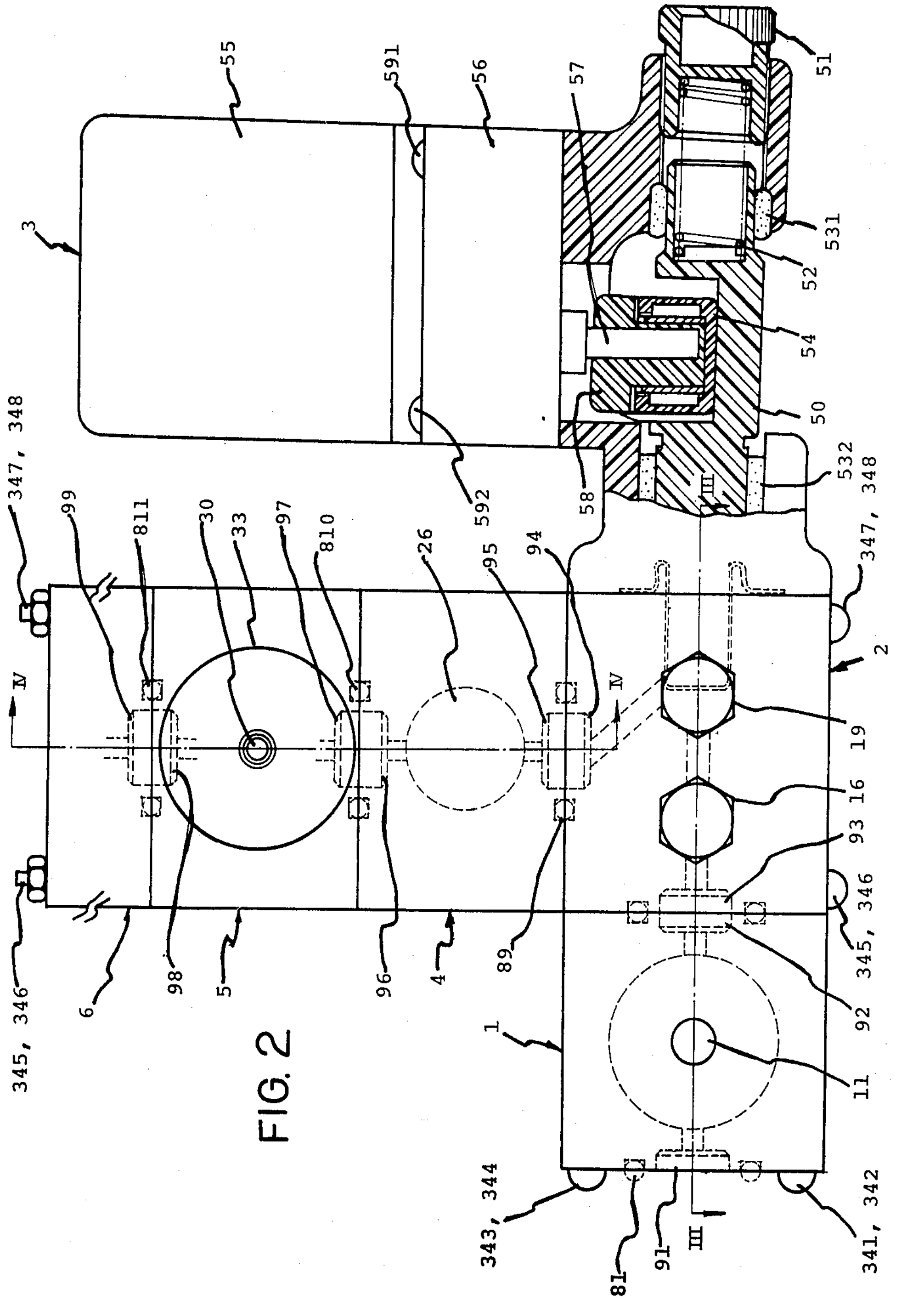
FIG. 2 is a partially sectional plan view of an embodiment of an ink liquid supply system of the present invention.
Figure 3:
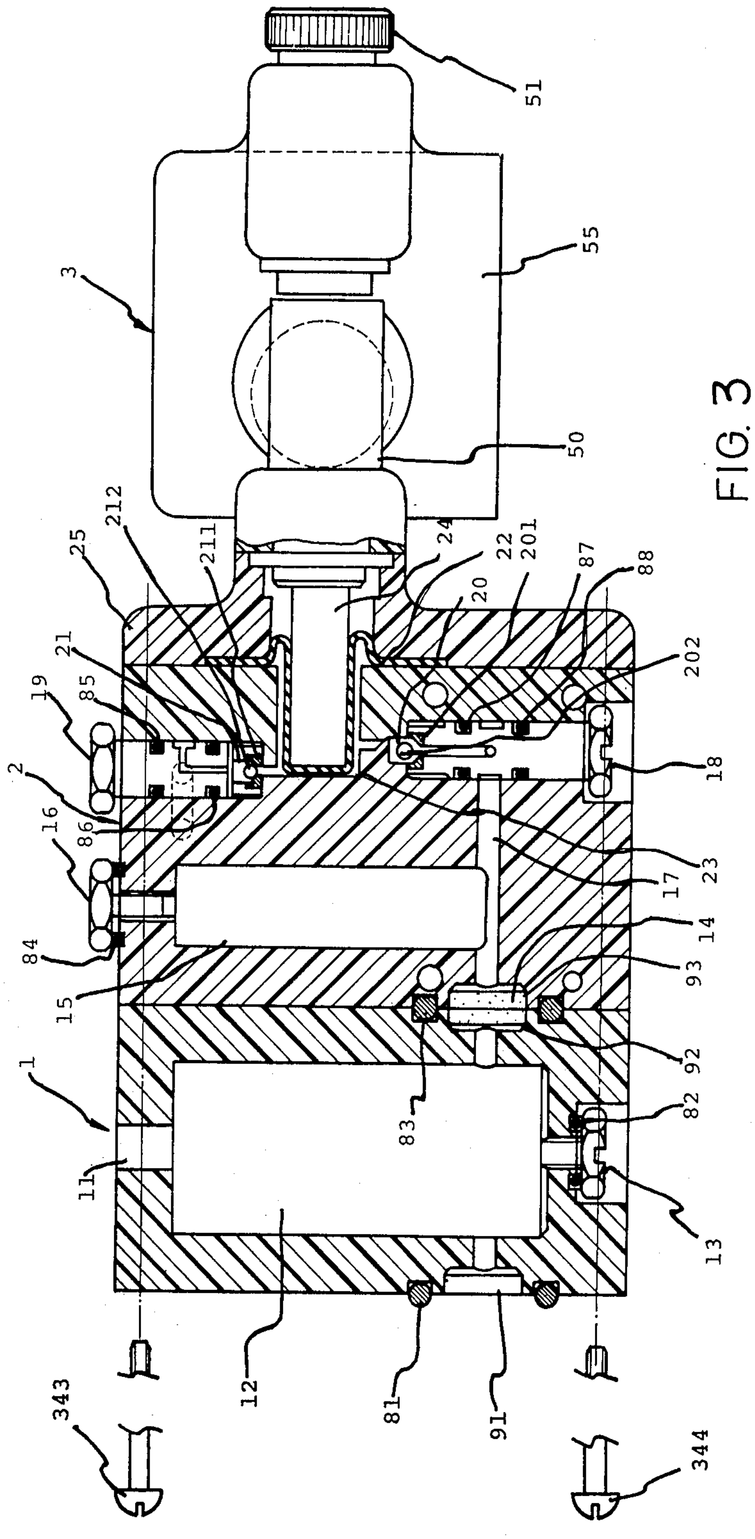
FIG. 3 is a partially sectional front view of the ink liquid supply system of FIG. 2, the sectional view being taken along the line III—III of FIG. 2.
Figure 4:
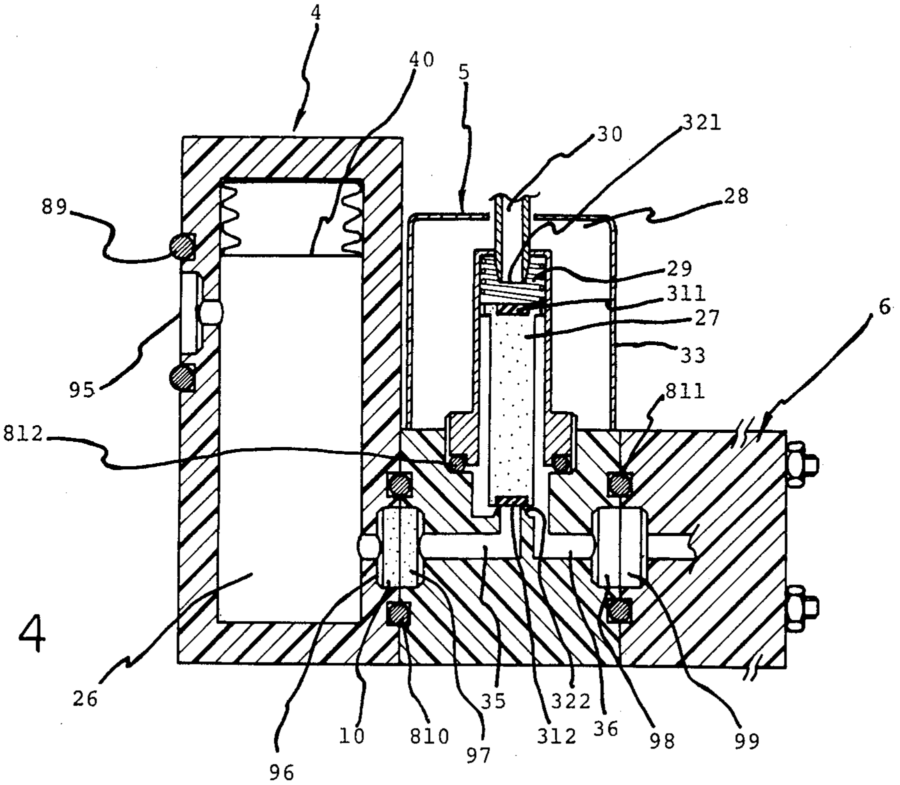
FIG. 4 is a sectional view taken along the line IV—IV of FIG. 2.

FIGS. 2 through 4 show an embodiment of an ink liquid supply system of the present invention. FIG. 3 is a sectional view taken along the line III — III of FIG. 2, and FIG. 4 is a sectional view taken along the line IV — IV of FIG. 2.

In this embodiment, the ink liquid reservoir 101, prefilter means 102, air trap 103, bellofram pump 104, air chamber 105, main filter 106 and electromagnetic cross valve 107 are substantially made of resin blocks and fixed to each other in a single body.

The system of FIGS. 2 through 4 mainly comprises six blocks made of resin. A first block 1 is an ink liquid reservoir unit including an ink liquid reservoir 12 as shown in FIG. 3. A second block 2 is a pump unit including an air trap 15 and a bellofram pump assembly. A third block 3 is a pump drive unit. A fourth block 4 is an air chamber unit including an air chamber 26. A fifth block 5 is an electromagnetic cross valve unit, and a sixth block 6 is a coupling unit for connecting the ink liquid supply system to the body of the ink jet system printer.

The above-mentioned ink liquid reservoir unit 1, the pump unit 2 and the pump drive unit 3 are fixed to each other in a single body by screws and nuts 341, 342, 343 and 344. The air chamber unit 4, the electromagnetic cross valve unit 5 and the coupling unit 6 are integrally connected to the pump unit 2 by screws and nuts 345, 346, 347 and 348. In this way, the integrated ink liquid supply system is formed. Respective units are made of transparent acryl resin.

The ink liquid reservoir unit 1 comprises a connection hole 91 for connecting the ink liquid supply system to the ink cartridge 100; an ink liquid recovering inlet 11 connected to receive the ink liquid from the beam gutter 112 and the returning conduit 114; the ink liquid reservoir 12 (corresponding to the ink liquid reservoir 101 of FIG. 1); a drain screw 13 for taking out the ink liquid contained within the ink liquid reservoir 12 when it is required; and an outlet 92 which will be communicated to the pump unit 2.

The outlet 92 of the ink liquid reservoir unit 1 confronts an inlet 93 of the pump unit 2 and they are connected to each other via a sealing ring 83. A prefilter means 14 (corresponding to the prefilter means 102 of FIG. 1) is installed within a clearance surrounded by the outlet 92 and the inlet 93. Sealing rings 81 and 82 are provided at the connection hole 91 and the drain screw 13, respectively, thereby preventing the leakage of the ink liquid therethrough.

The pump unit 2 comprises the inlet 93; the air trap 15 (corresponding to the air trap 103 of FIG. 1); a screw 16 for taking out the air contained within the air trap 15 when it is required; and a suction channel 17. The ink liquid flows from the inlet 93 to a pump chamber through the suction channel 17. Bubbles contained within the ink liquid are removed at the air trap 15 within which the ink liquid is filled. A sealing ring 84 is provided for preventing the leakage of the ink liquid via the screw 16.

The pump unit 2 further comprises a suction valve 20 including a valve seat 201 and a ball valve 202; a delivery valve 21 including a valve seat 211 and a ball valve 212; a bellofram 22; a pressure chamber 23; and a plunger rod 24 which is driven to reciprocate by the pump drive unit 3. Adjusting screws 18 and 19 are provided for adjusting the seal operation of the suction valve 20 and the delivery valve 21, respectively. Sealing rings 85, 86, 87 and 88 are provided for preventing the leakage of the ink liquid through the adjusting screws 19 and 18, respectively.

The volume of the pressure chamber 23 varies as the plunger rod 24 reciprocates, because the bellofram 22 is driven to reciprocate in unison with the plunger rod 24. When the plunger rod 24 is driven to travel right, the volume of the pressure chamber 23 is increased and, therefore, the ink liquid is introduced from the suction channel 17 into the pressure chamber 23 through the suction valve 20. At this moment, the ball valve 212 of the delivery valve 21 becomes contact with the valve seat 211, thereby preventing the back flow of the ink liquid. When the plunger rod 24 is driven to travel left, the volume of the pressure chamber 23 is reduced to increase the liquid pressure within the pressure chamber 23 and, therefore, the suction valve 20 is closed and the delivery valve 21 is open. The ink liquid in the pressure chamber 23 is supplied to the air chamber 26.

The pump drive unit 3 mainly comprises a fixing table 25 and a driving section for driving the plunger rod 24. The fixing table 25 functions as a supporting bed for fixing the ink liquid reservoir unit 1, the pump unit 2 and the pump drive unit 3 to each other.

The plunger rod 24 is directly fixed to a plunger 50 which is slidably supported by sleeve bearings 531 and 532. The plunger 50 is depressed toward the pressure chamber 23 by a spring 52, the depression force being adjustable through a stroke adjust handle 51. With such an arrangement, the delivery pressure of the ink liquid from the pump unit 2 is maintained at a constant value.

The driving section comprises an induction motor 55; a gear box 56; an eccentric shaft 58 fixed to a rotation shaft 57; a needle bearing 54 interposed between the eccentric shaft 58 and the plunger 50; and screws 591 and 592 for installing the motor 55.

The revolution of the induction motor 55 is decelerated by the gear box 56 and applied to the rotation shaft 57. Therefore, the plunger 50 is driven to reciprocate via the eccentric shaft 58 and the needle bearing 54. The plunger 50 is driven to travel right by the needle bearing 54, and driven to travel left by the depression force caused by the spring 52.

Thus delivered ink liquid is supplied to the air chamber unit 4 acting as an accumulator. The air chamber unit 4 comprises the air chamber 26 (corresponding to the air chamber 105 of FIG. 1); a shock-absorbing means including a sealing wall 40 made of rubber; an inlet 95; and an outlet 96. The inlet 95 confronts an outlet 94 (shown by dotted lines in FIG. 2) of the pump unit 2. The sealing wall 40 of the shock-absorbing means functions to prevent the ink liquid in the air chamber 26 from coming into contact with the air. The outlet 96 confronts an inlet 97 of the following electromagnetic cross valve unit 5. Sealing rings 89 and 810 are provided for preventing the leakage of the ink liquid through the coupling points of the outlet 94 and the inlet 95 and the outlet 96 and the inlet 97, respectively.

The air chamber unit 4 functions to remove the pressure pulsation caused by the pump, and supplies the electromagnetic cross valve unit 5 with the ink liquid at a constant, uniform pressure. The sealing wall 40 functions not only to protect the ink liquid in the air chamber 26 from the surrounding air but also to remove the pressure pulsation caused by the pump and to accumulate a pressure sufficient to minimize the preparation time required for preparing the system printer for conditions suited for stable printing after power is thrown on.

The thus formed flow of ink liquid at a constant pressure is supplied to the electromagnetic cross valve unit 5 through the inlet 97. A line filter 10 (corresponding to the main filter 106 of FIG. 1) is installed within a clearance surrounded by the outlet 96 and the inlet 97. The filtration accuracy of the line filter 10 is so selected that it only leaves particles of which diameter is below 3 $\mu$m.

The electromagnetic cross valve unit 5 comprises an input port 35; an output port 36; and an outlet 30 connected to the returning conduit 114 shown in FIG. 1. The input port 35 is connected to receive the ink liquid from the air chamber 26 via the inlet 97, and the output port 36 delivers the ink liquid toward the coupling unit 6. The electromagnetic cross valve unit 5 further comprises an electromagnetic valve plunger 27; an electromagnetic valve coil 28; a depression spring 29 for depressing the valve plunger 27 downward; valve sealings 311 and 312 made of rubber; valve seats 321 and 322; and a sealing ring 812.

When the electromagnetic valve coil 28 is enabled, the electromagnetic valve plunger 27 is pulled upward, thereby making the valve sealing 311 come into contact with the valve seat 321 to close the outlet 30 side, and releasing the valve sealing 312 from the valve seat 322 to communicate the output port 36 with the input port 35. Under these conditions the ink liquid is supplied to the coupling unit 6 via an outlet 98 which confronts an inlet 99 of the coupling unit 6.

When the electromagnetic valve coil 28 is disabled, the electromagnetic valve plunger 27 is depressed downward by the depression spring 29, thereby making the valve sealing 312 come into contact with the valve seat 322 to close the input port 35. At this moment the valve sealing 311 is released from the valve seat 321 to communicate the outlet 30 with the output port 36. This creates the back flow of the ink liquid toward the ink liquid reservoir 12 through the returning conduit 114. The returning conduit 114 is formed at the outside of the ink liquid supply system made of six resin blocks, and connects the outlet 30 to the ink liquid recovering inlet 11 of the ink liquid reservoir unit 1.

The back flow of the ink liquid is caused by the negative pressure of the electromagnetic cross valve side with respect to the nozzle side. The negative pressure is created when the electromagnetic valve coil 28 is disabled, because the diameter of the flexible conduit 109 and the nozzle outlet 111 (see FIG. 1) is considerably small. A water-proof seal 33 is provided for protecting the electromagnetic valve coil 28 from the liquid such as the ink liquid. A sealing ring 811 is provided for preventing the leakage of the ink liquid at the connection point of the outlet 98 and the inlet 99.

The coupling unit 6 corresponds to the coupler 108 of FIG. 1. Detailed constructions of the coupling unit 6 are omitted from the description. The above-mentioned six blocks are fixed to each other to form the ink liquid supply system in a single body of which size is 20 (cm) $\times$ 15 (cm) $\times$ 7 (cm). The above-mentioned blocks can be integrated in a single body.

FIGS. 5 through 8 show another embodiment of the ink liquid supply system of the present invention.

In this embodiment, the ink liquid reservoir 101 and the bellofram pump 104 are mounted on a first resin base, and the air chamber 105, the main filter 106 and the electromagnetic cross valve 107 are mounted on a second resin base. Conduit means for communicating the respective components mounted on the resin base are formed within the resin base. The air trap 103 is omitted in this embodiment since the bubbles are hardly formed when the conduit means are considerably short.

Figure 5:
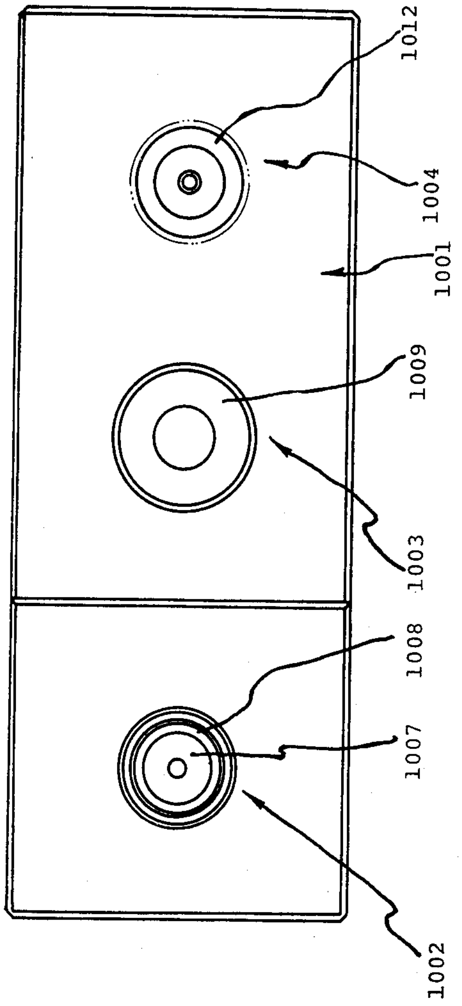
FIG. 5 is a plan view of a resin base employed in another embodiment of an ink liquid supply system of the present invention.
Figure 6:
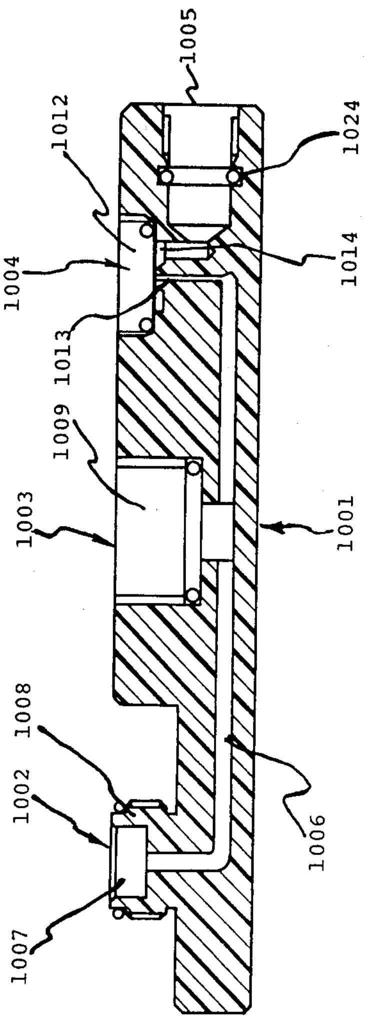
FIG. 6 is a sectional view of the resin base of FIG. 5.

FIGS. 5 and 6 show an example of the second resin base. A main filter mounting section 1002, an air chamber mounting section 1003, an electromagnetic cross valve unit mounting section 1004 and a coupler receiving section 1005 are formed in a resin base 1001 made of acryl resin. Conduit means 1006 are formed within the resin base 1001 for communicating the respective sections 1002 through 1005 with each other.

The main filter mounting secton 1002 has a projection 1008 including a screw cutting formed on the outer surface thereof, and an opening 1007 connected to the conduit means 1006. The main filter is mounted on the main filter mounting section 1002 through the use of the screw cutting formed on the projection 1008.

Figure 9:
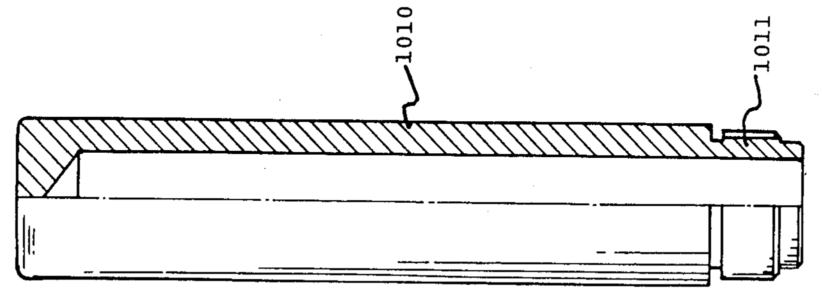
FIG. 9 is a partially sectional front view of an embodiment of an air chamber to be mounted on the resin base of FIGS. 5 and 6.

The air chamber mounting section 1003 has an indent 1009 including a screw cutting formed on the inner surface thereof. An air chamber 1010 has a fixing section 1011 including a screw cutting formed on the outer surface thereof as shown in FIG. 9. The fixing section 1011 of the air chamber 1010 is fixed to the indent 1009 through the use of the screw cuttings. A sealing ring holder is provided at the bottom of the indent 1009 for preventing the leakage of the ink liquid therethrough.

The electromagnetic cross valve unit mounting section 1004 has an indent 1012 including a screw cutting formed on the inner surface thereof. The indent 1012 has an opening 1013 connected to the conduit means 1006, which is in turn connected to the air chamber mounting section 1003, and an opening 1014 communicated with the coupler receiving section 1005. A sealing ring holder is provided at the bottom of the indent 1012 for preventing the leakage of the ink liquid therethrough.

Figure 10:
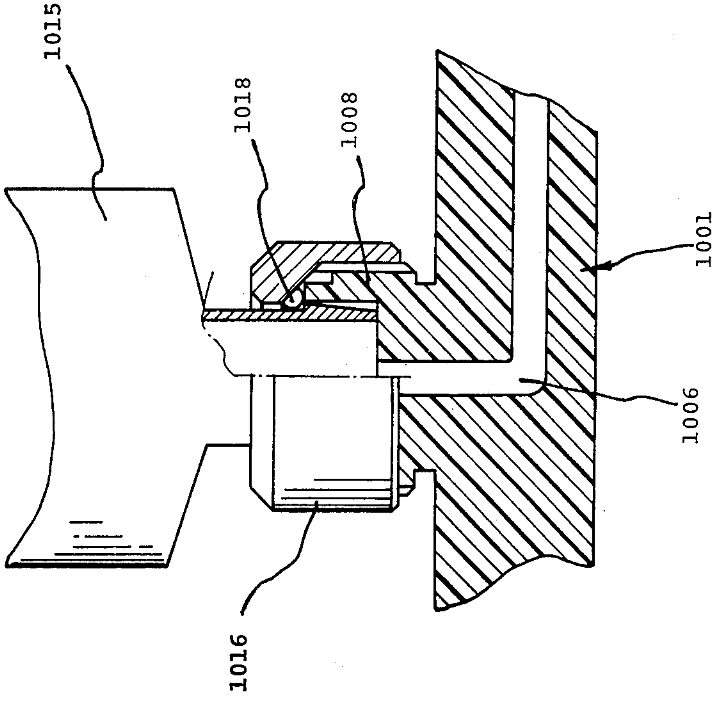
FIG. 10 is a partially sectional view showing a main filter mounted on and fixed to the resin base of FIGS. 5 and 6.

FIG. 10 shows a main filter 1015 (corresponding to the main filter 106 in FIG. 1) mounted on the main filter mounting section 1002. A nut 1016 is rotatably secured at the end portion of the main filter 1015. A sealing ring 1018 is provided for preventing the leakage of the ink liquid through the connection point of the main filter 1015 and the resin base 1001.

Figure 11:
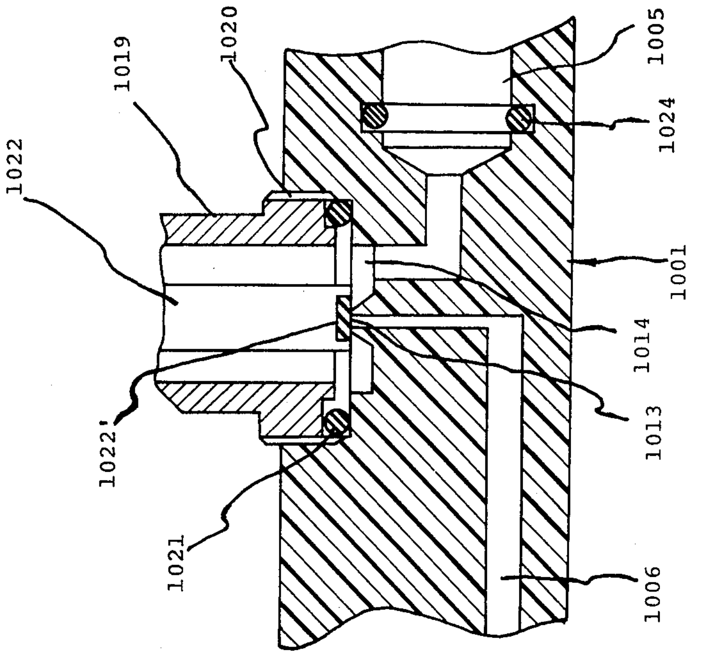
FIG. 11 is a sectional view showing a condition when an electromagnetic cross valve is mounted on and fixed to the resin base of FIGS. 5 and 6.

FIG. 11 shows an electromagnetic cross valve unit 1019 mounted on the electromagnetic cross valve unit mounting section 1004. The electromagnetic cross valve unit 1019 has a screw cutting 1020 corresponding to the screw cutting formed on the inner surface of the indent 1012. A sealing ring 1021 is provided for preventing the leakage of the ink liquid through the connection point of the electromagnetic cross valve unit 1019 and the resin base 1001. The electromagnetic cross valve unit 1019 includes a plunger 1022 and a sealing means 1022' fixed to the end of the plunger 1022 for closing the opening 1013.

FIG. 11 shows a condition where the electromagnetic cross valve unit 1019 is disabled. The plunger 1022 is depressed downward by a spring means (not shown) to close the opening 1013. When the electromagnetic cross valve unit 1019 is enabled, the plunger 1022 is pulled upward to open the opening 1013. The openings 1013 and 1014 are communicated with each other to conduct the ink liquid from the conduit means 1006 to the coupler receiving section 1005.

Figure 12:
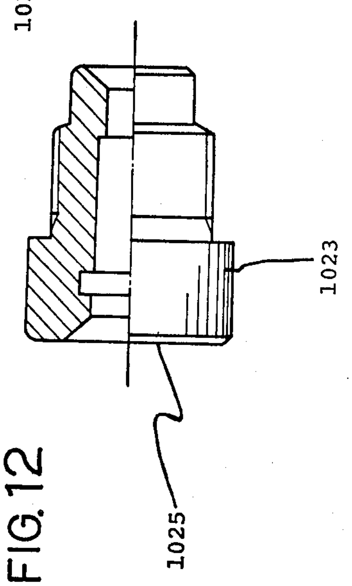
FIG. 12 is a partially sectional plan view of a coupler for connecting the ink liquid supply system to an ink liquid issuance unit in an ink jet system printer.

FIG. 12 shows a coupler 1023 to be fixed to the coupler receiving section 1005 via a sealing ring 1024. A flexible conduit 109 shown in FIG. 1 is connected to an outlet 1025 of the coupler 1023.

Figure 7:
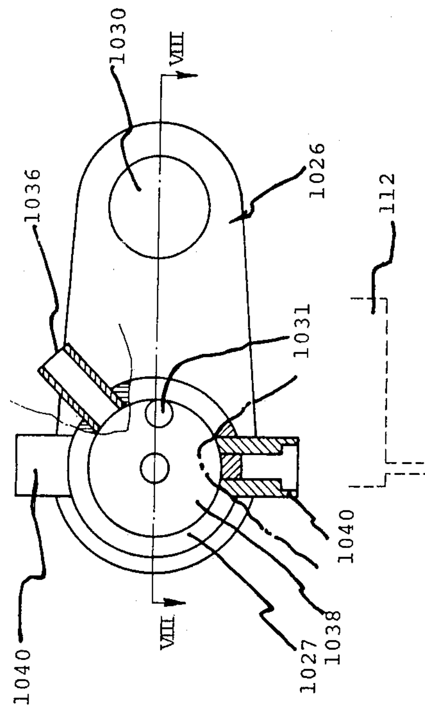
FIG. 7 is a plan view of another resin base employed in another embodiment of an ink liquid supply system of the present invention.
Figure 8:
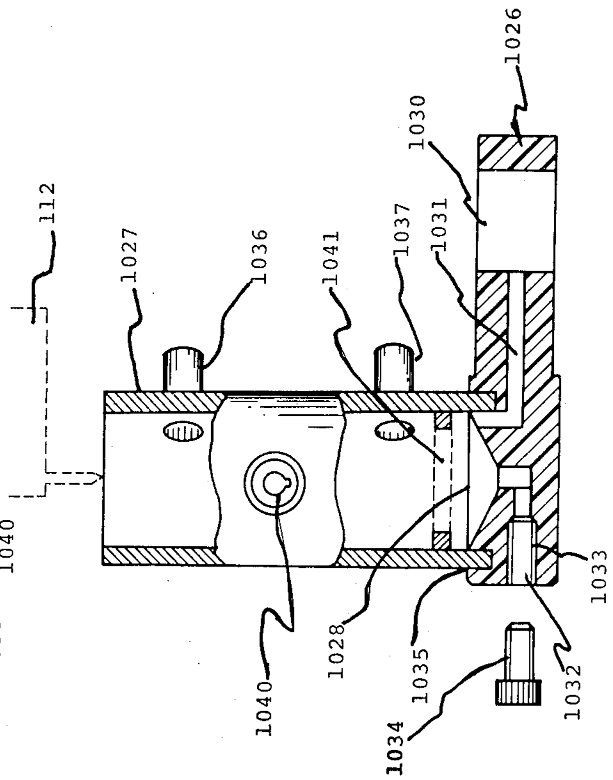
FIG. 8 is a sectional view of the resin base taken along the line VIII — VIII of FIG. 7.

FIGS. 7 and 8 show an example of the first resin base 1026 and an ink liquid reservoir 1027 mounted on the resin base 1026. The resin base 1026 comprises an opening 1028 for receiving the ink liquid reservoir 1027, a through opening 1030 for receiving a pump unit 1029 (shown in FIGS. 13 and 14), and a conduit means 1031 for connecting the openings 1028 and 1030 to each other. A screw 1034 is installed within an opening 1032 which has a screw cutting 1033 formed on the inner surface of the opening 1032, thereby facilitating the taking out of the ink liquid contained within the ink liquid reservoir 1027 when it is required.

A groove 1035 is formed to surround the opening 1028, to which the end portion of the ink liquid reservoir 1027 is inserted and fixed through the use of adhesive. The ink liquid reservoir 1027 includes a coupling means 1036 to be connected to the ink returning conduit 114 (see FIG. 1) associated with the electromagnetic cross valve unit, and another coupling means 1037 to be connected to the ink cartridge. The ink liquid reservoir 1027 further includes a recovering opening 1038 for recovering the ink liquid from the beam gutter 112, a light emitting - light responsive elements pair 1040 — 1040 for detecting the liquid level contained within the ink liquid reservoir 1027, and a prefilter means 1041.

Figure 13:
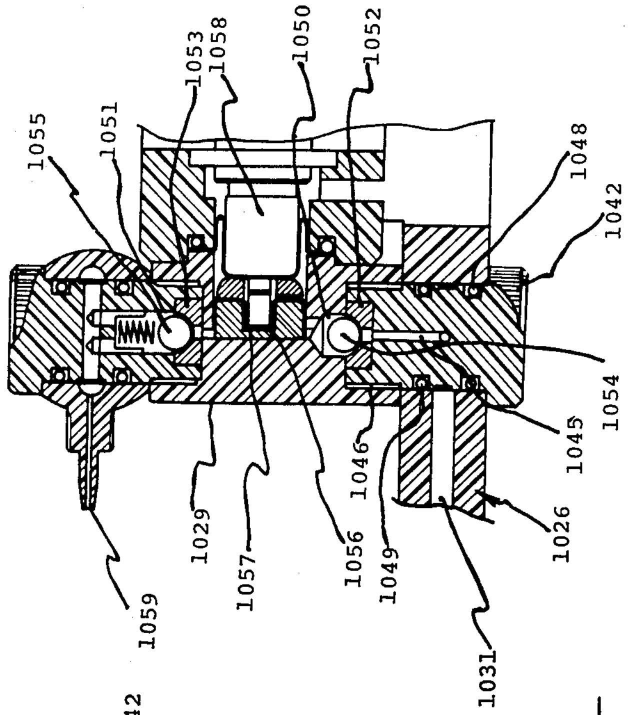
FIG. 13 is a sectional view of a pump mounted on and connected to the resin base of FIGS. 7 and 8.
Figure 14:
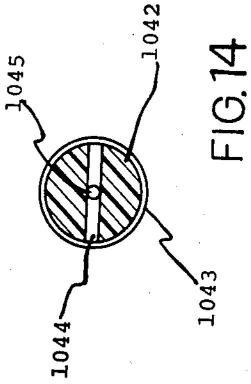
FIG. 14 is a sectional view of a coupling means for connecting the pump to the resin base of FIGS. 7 and 8.

FIG. 13 shows the pump unit 1029 fixed to the resin base 1026. A fixing member 1042 is inserted into the through opening 1030. The fixing member 1042 includes a groove 1043 formed on the side wall thereof, as shown in FIG. 14, a through hole 1044 traversing the fixing member 1042 and connected to the groove 1043, a conduit means 1045 communicated with the through hole 1044, and a screw cutting 1046 formed at the end portion of the fixing member 1042. The groove 1043, the through hole 1044 and the conduit means 1045 form, in combination, a path of the ink liquid. The pump unit 1029 is fixed to the resin base 1026 through the use of the screw cutting 1046. Sealing rings 1048 and 1049 are provided between the resin base 1026 and the fixing member 1042 for preventing the ink liquid leakage.

The pump unit 1029 comprises a suction valve 1050 including a valve seat 1052 and a ball valve 1054, a delivery valve 1051 including a valve seat 1053 and a ball valve 1055, a bellofram 1056, a pressure chamber 1057, and a plunger rod 1058 driven to reciprocate by a driving means (not shown).

When the plunger rod 1058 is driven to travel right, the volume of the pressure chamber 1057 is increased and, hence, the ink liquid is introduced into the pressure chamber 1057 from the conduit 1031 via the suction valve 1050. When the plunger rod 1058 is driven to travel left, the pressure of the pressure chamber 1057 is increased and, hence, the suction valve 1050 is closed and the delivery valve 1051 is open. The ink liquid is delivered to the outlet 1059 via the delivery valve 1051. The outlet 1059 is connected to the main filter 1015 (not shown).

In this way, the first resin base and the second resin base are connected with each other.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink liquid supply system for an ink jet system printer which emits ink droplets from a nozzle toward a record receiving member, selectively deflects said ink droplets by a deflection means, and prints desired symbols on said record receiving member with said deflected ink droplets, said ink liquid supply system being provided with an ink liquid reservoir for containing the ink therein and a pump for supplying the ink liquid from said ink liquid reservoir to said nozzle, the improvements comprising:

a modular assembly including at least one synthetic resin base block;

internal conduit means formed in said base block and terminating at the surfaces thereof in connectable configurations;

ink supply system components mounted on said base block at selected ones of said connectable configurations;

said components being interconnected through said conduit means internally of said base block; and external connecting means on said base block for interconnecting said modular assembly into a said ink jet system printer.

2. The invention defined in claim 1, wherein said ink supply system components in said modular assembly include:

an ink reservoir;

an ink pump for taking ink from said reservoir having an intake interconnected therewith through a said base block;

series connected filter means, accumulator means and control valve means fed by said pump means and mutually interconnected one with the other through a said base block; and coupling means in said modular assembly for interconnecting said control valve means with said ink reservoir and the said ink nozzle in said ink jet system printer.

3. The invention defined in claim 2, wherein said ink liquid reservoir and said pump are mounted on a common base block; and wherein said series connected filter means, accumulator means and control valve means are mounted on a second common base block.

4. The invention defined in claim 2, wherein said ink liquid reservoir and said pump are mounted on respectively individual base blocks each having said internal conduit means therein; and said base blocks being interconnected to communicate said pump means with said reservoir through internal conduit means.

* * * * *